July 2, 1935.  R. H. SEGAL  2,006,485
CALENDAR
Filed Jan. 11, 1935  2 Sheets-Sheet 1
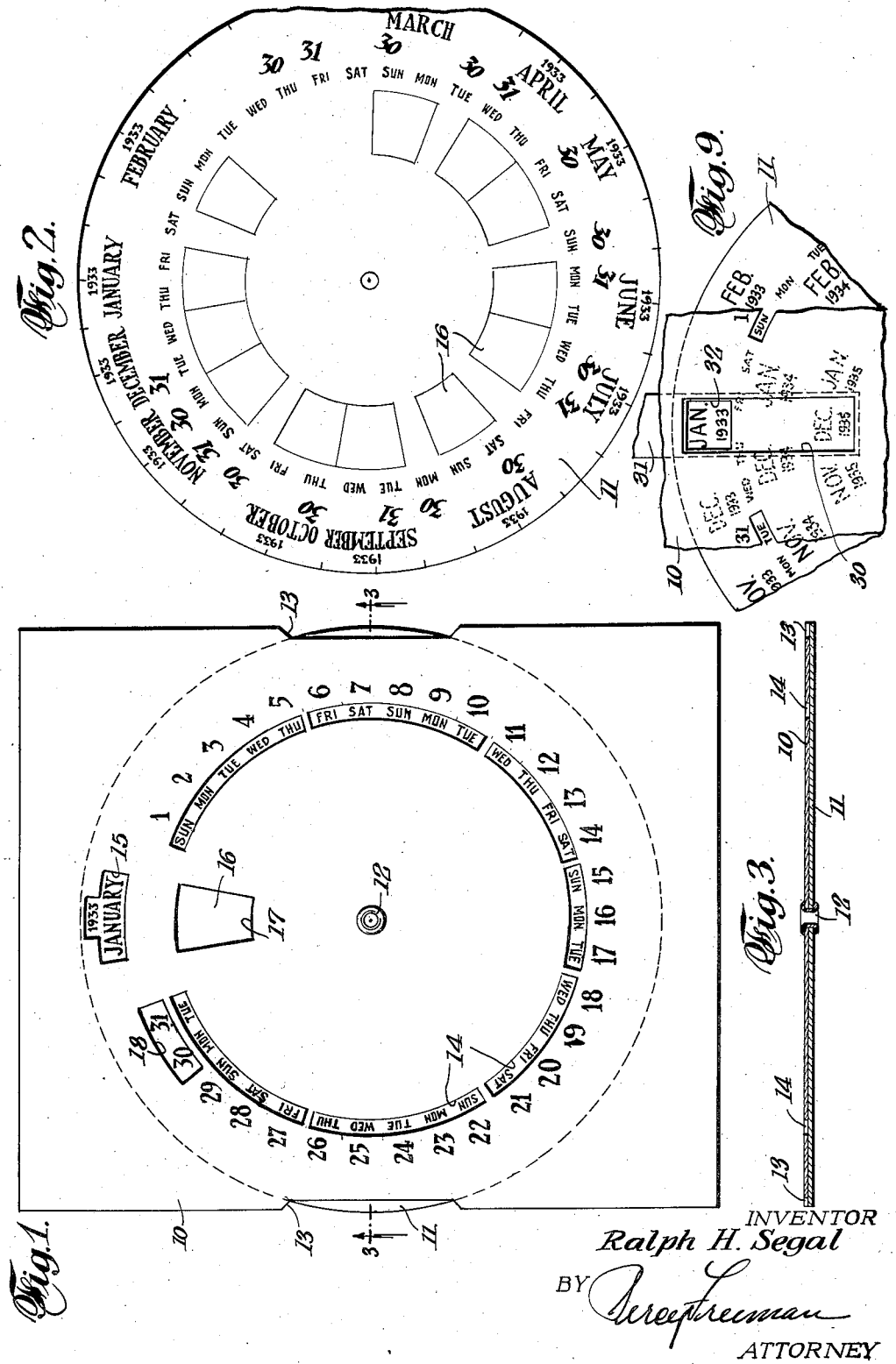
INVENTOR
Ralph H. Segal
BY
ATTORNEY July 2, 1935.                    R. H. SEGAL                    2,006,485
                                  CALENDAR
                          Filed Jan. 11, 1935        2 Sheets-Sheet 2
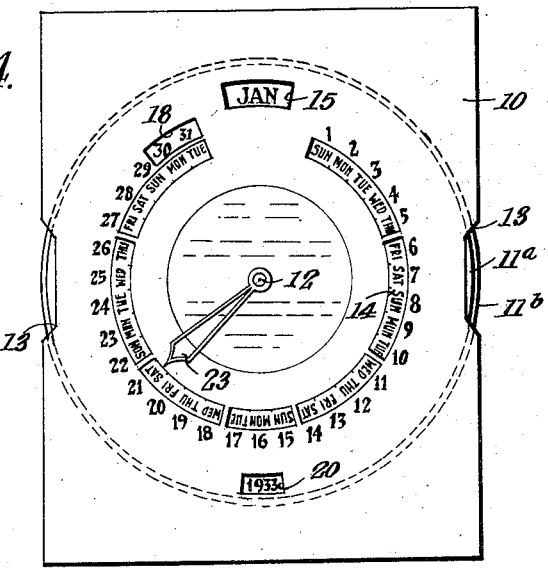
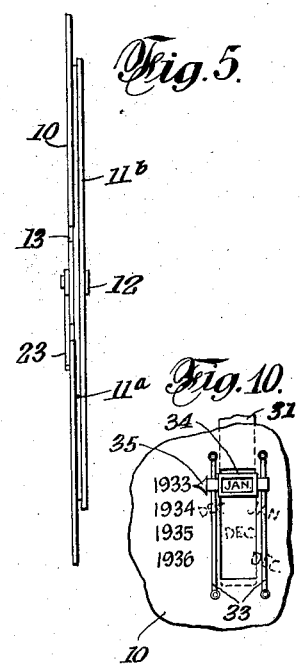
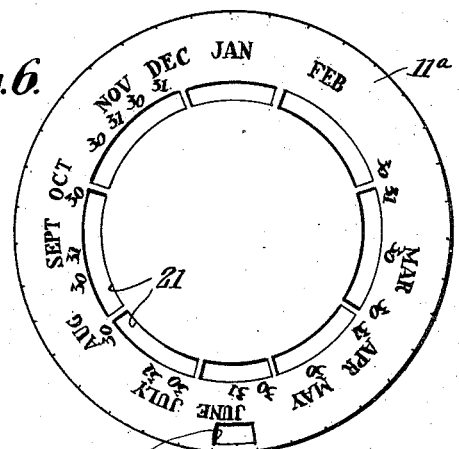
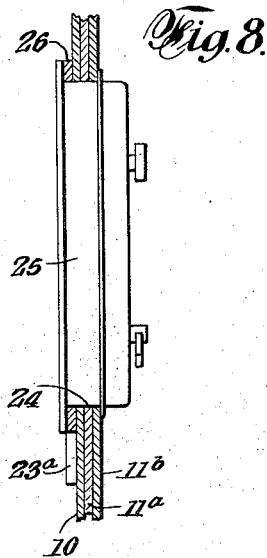
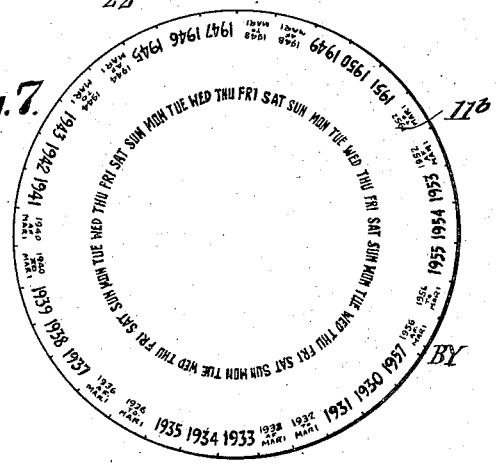
INVENTOR.
Ralph H. Segal
BY
ATTORNEY.

Patented July 2, 1935

2,006,485

UNITED STATES PATENT OFFICE 2,006,485

CALENDAR

Ralph H. Segal, New York, N. Y.

Application January 11, 1935, Serial No. 1,269

6 Claims. (Cl. 40—115)

This invention relates to calendars and especially to a flat device comprising an outer plate or sheet having certain indicia and certain openings and one or more circular indicia bearing sheets pivotally connected to the outer sheet whereby, in effect, a dial-like calendar is provided capable of being set monthly.

It is conceded that dial calendars have been heretofore contemplated, but wherein they have been at fault was that every month of the year was shown as having thirty-one days. While the vast majority of people are aware of this, they are not, in the same proportion, aware of the number of days in any particular month.

It is, therefore, an object of the present invention to provide a circular or dial calendar in which each month of the year is shown with its proper number of days.

A further object of the invention is to provide a dial calendar of this type which is perpetual, or at least will serve for several years.

The invention, as here contemplated, seeks to provide a dial calendar in which the outer sheet has thereon the days of the month from "1" to "28" or "29", and another circular sheet pivoted to the outer sheet on which is borne the names of the month and respective days of the month from "29" to "30" or "31", or "30" and "31", or "30" alone. Such a calendar may have the names of the days of the week on the sheet which has the days of the month, or may have these names on a separate sheet pivotally arranged with the two sheets mentioned.

The invention also contemplates the use of one or more pointers, which may be set from day to day or from time to time to insure proper reading of the calendar or as a prompter of the memory of the user.

It is also contemplated to provide the outer sheet with reading matter which may take the form of advertising or the like, such legend being also placeable on one of the nether sheets and viewable through an opening in the outer sheets.

Further, the invention contemplates the incorporation of an opening through the sheets comprising the calendar into which may be inserted a time-piece so there is provided a device by which not only the year, month and day may be read, but also the hour, minute and second.

The above features and advantages of the invention are carried out in the novel combination and arrangement of the parts comprising the calendar as exemplified in the embodiments of the invention illustrated in the accompanying drawings, described in the following specifications, and in which:—

Fig. 1 is a face view of a dial calendar incorporating features of the invention.

Fig. 2 is a face view of the pivotally settable disc shown in Figure 1.

Fig. 3 is a cross-sectional view as taken along the line 3—3 of Figure 1.

Fig. 4 is a face view of a dial calendar for more than one year.

Fig. 5 is an edge view thereof.

Figs. 6 and 7 are face views of the settable discs shown in Figure 4.

Fig. 8 is a partial sectional view showing a time-piece incorporated with the calendar.

Fig. 9 is a fragmentary detail view of an alternate form of calendar.

Fig. 10 is a fragmentary detail view of still another modification.

In the drawings, and with particular reference to Figures 1, 2, and 3, the calendar comprises an outer plate or sheet 10 of suitable size and shape and of a material which will afford proper rigidity; and another plate or sheet 11, preferably circular. These two sheets are pivotally attached to each other as at 12 in a manner whereby the sheet 11 may be rotated in relation to the sheet 10 and positioned as desired.

The sheet 10 is provided with one or more notches such as 13 to expose a peripheral portion of the disc 11 so it may be gripped for turning.

The face of the sheet 10 is preferably provided with a series of numbers, from "1" to "29" (as shown) or from "1" to "28", starting at the upper right and disposed radially about the center 12.

Paralleling the members, the card 10 is provided with arcuate openings 14, through which are visible the names of the days of the week carried by the disc 11. The card 10 is also provided with an opening 15 through which may be viewed the name of the month (carried on the disc 11) for which the calendar is set.

The face of the plate 10 provides sufficient surface for display advertising, and if desired, the disc 11 may have printed thereon, in the spaces 16, other legend of interest such as the names of holidays, interest days, tax days, etc., visible through the opening 17 in the plate 10.

It will be noted that the days of the month are shown (on plate 10) as terminating at "29". Inasmuch as certain months have thirty days and others thirty-one days, there is imprinted on the disc 11, and in definite relation to the name of the month, the number "30" or the numbers "30" and "31" as the case might be. This number or these numbers may be viewed through an opening 18 in the plate 10.

The drawings illustrate an example of the co-ordination of the various printings on the plates 10 and 11 and as illustrated, and for the year 1933, the month of January which has thirty-one days, has its first day fall on Sunday; the month of February which has twenty-eight days, has its first day fall on Wednesday. The portion of the disc 11 seen through the opening 18 will appear blank.

In this manner (with the exception of February) only the exact number of days of the month for which the calendar is set, are visible.

A calendar constructed as above described would be for one particular year, but if desired the disc 11 might be printed on both sides so two years may be provided for; or a plurality of discs 11 may be supplied with one outer plate 10 to be interchangeably used therewith so several years may be cared for.

The form of the invention shown in Figure 9 employs the outer plate 10 and the disc 11 as heretofore; but in this instance, the disc 11 is provided with a series of concentrically arranged printings of the names of the month together with the year. These concentric printings are each offset radially so that for any particular year, each is in definite relation to the printed days of the week also provided on this disc.

To facilitate the reading of such a calendar, the front plate is provided with an elongated opening 30 so all of the printings of the month may be exposed as desired, and in association with this opening there is provided a slide member 31 or its equivalent having an opening 32 so that any single name of a month may be viewed therethrough.

In the illustration for example, the calendar is set for the year "1933", and for the month of "January". Now, for each succeeding month the disc 11 is rotated as previously described. For the following year, that is "1934", the slide 31 is moved down so the opening 32 therein will successively expose the names of the months in the middle printing, etc. In this manner, a two-plate calendar is provided for several years' use. The other face of the disc 11 may also be similarly printed for succeeding years.

The form of the invention shown in Figures 4, 5, 6, and 7 discloses a dial calendar which may be used through a greater period of years. In this instance the outer plate 10 is similar to the one first described but with the addition of another opening 20, and instead of one disc 11, there is provided two:—an intermediate disc 11ª and a rear disc 11ᵇ.

The disc 11ª has printed thereon the names of the months and the final days as heretofore; and in addition is provided with the arcuate openings 21 in register with the openings 14 in the plate 10, and an opening 22 which registers with the opening 20.

The disc 11ᵇ is provided with the names of the days of the week arranged circularly as before and with the year numbers (in this instance from "1930" to "1957").

In order to maintain the calendar in proper adjustment at all times, two settings are required during leap years. One setting is made on January 1st and the second on March 1st as can readily be understood.

A calendar constructed in this manner may be used, as can be seen, for many years and if there is supplied several discs 11ᵇ with the numbers of the years that follow, such a calendar would last a life-time.

To assist in reading the calendar, a pointer 23, skeletonized so as not to obscure the face of the plate 10, may be provided to point to each day successively or to some particular date of which the user wishes to be reminded.

Following the practise of pad calendars, each "Sun" may be colored differently than the names of the other days of the week, or the names of the days of each week may be differently colored for readier reference.

If desired, the calendar may be provided with a large central opening 24 (see Fig. 8) into which may be placed a timepiece constructed for the purpose as shown at 25 so a complete time indicator is visible to the eye—from the year, month, and day down to the hour, minute, and second. A pointer 23ª may also be provided. This pointer being formed with a ring 26 which utilizes the periphery of the timepiece as a bearing about which it may be moved.

Many improvements may be made such as providing the pointer or a separate disc with an enlarging lens so a particular date may be prominently set forth; keeping the center of the plate 10 clear for advertising by mounting the pointer on a projecting portion which, in turn may carry display wording or pictures; etc.

A version of the calendar is shown in Figure 9 wherein the front plate 10 is provided with an elongated opening 30, and a slide 31 is arranged to be moved longitudinally in relation thereto. The slide is provided with an opening or window 32 so that at the desire of the user, any one of several concentric bands of indicia on the plate 11 is visible therethrough as can be clearly seen from the illustration.

A refinement of the form shown in Figure 9 is illustrated in Figure 10 where the year is shown on the plate 10 so the setting of the slide 31 is facilitated. In carrying out this form of the invention slide bars 33 are employed to guide the frame 34 which is fixed to the slide 31. A pointer 35 associated with the indicia "1933", "1934", etc. facilitates this setting.

Although I have described my improvements with considerable detail and with respect to certain particular forms of my invention, I do not desire to be limited to such details since many changes and modifications in the form, arrangements, proportions, and sizes thereof, may well be made without departing from the spirit and scope of my invention in its broadest aspect.

Having thus described my invention, what I claim as new and desire to secure by Letters Patent, is:

1. A dial calendar comprising means whereby each month of the year is shown with its proper number of days, said means including a plate having an opening and numbers corresponding to the days of the month common to all the months, and another plate pivoted to the first plate having the names of the months and numbers readable in connection with the numbers on said first plate through the mentioned opening.

2. A dial calendar comprising means whereby each month of the year is shown with its proper number of days, said means including a plate having a plurality of openings and numbers corresponding to the days of the month common to all the months, and another plate pivoted to the first plate having the names of the months, the names of the days of the week, and numbers readable in connection with the numbers on said first plate, the name of a selected month being readable through one of said openings, the names of the days of the week being readable through others of said openings, and the last mentioned numbers readable through another of said openings.

3. In a dial calendar an outer plate having openings and numbers corresponding to the days of the month common to all the months, a disc pivoted to said outer plate, said disc having the names of the months thereon and numbers representing the final days of the month coordinated with the names of the days of the month, said last mentioned numbers being readable through one of the openings in connection with the first mentioned numbers for any particular setting of the disc to show the proper number of days for any particular month.

4. A dial calendar comprising three plates pivotally connected to each other, numbers corresponding to the days of the month common to all the months on one of said plates, the names of the months and numbers corresponding to the remaining days of the month on the second of said plates, said last mentioned numbers being selectively readable in connection with the first mentioned numbers, and the names of the days of the week and of several successive years on the third plate, said last mentioned names being readable through openings in the first and second plates.

5. A dial calendar comprising means whereby each month of the year is shown with its proper number of days, said means including a plate having an opening and numbers corresponding to the days of the month common to all the months, and another plate pivoted to the first plate having the names of the months and numbers readable in connection with the numbers on said first plate through the mentioned opening and a pointer, mounted at the pivot of the plates associated with the days of the month printed on both plates.

6. A dial calendar comprising three plates pivotally connected to each other, numbers corresponding to the days of the month common to all the months on one of said plates, the names of the months and numbers corresponding to the remaining days of the month on the second of said plates, said last mentioned numbers being selectively readable in connection with the first mentioned numbers, and the names of the days of the week and of several successive years on the third plate, said last mentioned names being readable through opening in the first and second plates, and a pointer associated with the days of the month printed on the first two plates.

RALPH H. SEGAL.